United States Patent
Xie

[11] Patent Number: 5,999,222
[45] Date of Patent: Dec. 7, 1999

[54] DIGITAL VERTICAL SYNC SEPARATOR

[75] Inventor: Guoxin Xie, Carlsbad, Calif.

[73] Assignee: Hughes-JVC Technology Corporation, Carlsbad, Calif.

[21] Appl. No.: 08/923,296

[22] Filed: Sep. 4, 1997

[51] Int. Cl.[6] .................. H04N 5/08; H04N 5/04; H04N 5/10

[52] U.S. Cl. .............. 348/525; 348/500; 348/545; 348/547

[58] Field of Search ................. 348/500, 525, 348/526, 529, 530, 540, 541, 542, 545, 548, 547; H04N 5/08, 5/04, 5/10; H03L 7/00

[56] References Cited

U.S. PATENT DOCUMENTS

| | | |
|---|---|---|
| 3,925,613 | 12/1975 | Kokado . |
| 4,240,111 | 12/1980 | Meise ........................... 358/154 |
| 4,379,309 | 4/1983 | Berke et al. . |
| 4,405,945 | 9/1983 | Sato ............................. 358/154 |
| 4,621,289 | 11/1986 | Bart et al. . |
| 4,675,734 | 6/1987 | Widom .......................... 348/530 |
| 4,694,340 | 9/1987 | Tanaka . |
| 4,722,004 | 1/1988 | Miyamoto ..................... 358/139 |
| 4,999,708 | 3/1991 | Aoki et al. . |
| 5,309,236 | 5/1994 | Park ............................. 348/500 |
| 5,402,488 | 3/1995 | Karlock ......................... 380/5 |
| 5,467,140 | 11/1995 | Sohn . |
| 5,485,220 | 1/1996 | McNeilly et al. . |

Primary Examiner—John K. Peng
Assistant Examiner—Wesner Sajous
Attorney, Agent, or Firm—Harness, Dickey & Pierce, P.L.C.

[57] ABSTRACT

An improved high-performance vertical sync separator which can reliably operate during high frequency and non-standard video signal conditions and that utilizes a device-independent methodology. The synch separator includes a signal separator circuit having an input port for receiving a composite signal. A measuring device connected to the input port measures a first and second characteristic of the composite signal. A processor receives and compares the first and second characteristics, and recovers a vertical sync signal from the composite signal.

21 Claims, 4 Drawing Sheets

DIGITAL VERTICAL SYNC SEPARATOR

BACKGROUND OF THE INVENTION

1. Technical Field

The present invention relates generally to devices and methods for processing synchronization signals used to coordinate scanning in video devices and, more particularly, to a digital vertical sync separator that can separate a vertical synchronization signal from a high frequency and nonstandard input video signal.

2. Discussion

A typical video signal contains a composite synchronization signal that coordinates the horizontal and vertical sweeping action of an image scanning beam. The scanning beam generates a video image by drawing a series of horizontal lines starting at the top of the image in a left to right direction. When the video image has been completely generated by the scanning beam, the scanning beam returns to the upper left-hand corner of the image, and the scanning process is repeated. The horizontal and vertical sweeping action allows the video image be displayed in raster-like fashion on a screen or other viewing surface.

Embedded within the composite synchronization signal are horizontal and vertical synchronizing, or sync, pulses. These sync pulses occur, as the scanning beam is retraced, to effectively create horizontal and vertical blanking intervals. To properly blank the scanning beam, however, the vertical sync pulse must be separated from the horizontal sync pulse.

The separation of composite synchronization signals into their component parts has long been performed in the video arts using a variety of analog and digital methods and devices. Many of these methods are inflexible, in that they rely on particular timing characteristics of components used to effect the separation. Other methods process the composite synchronization signal by comparing an input sync signal with a reference signal having a known standard format. Such a methodology cannot reliably separate the composite synchronization signal into its component parts when the input signal is of a non-standard format. Still other sync separation methodologies cannot operate when the vertical sync frequency exceeds a certain value. For example, many sync separation devices cannot reliably separate a vertical sync signal when the frequency of the vertical sync signal is higher than 150 Hz. In addition, the circuitry required to implement these synch separation devices often requires numerous components and complicated circuit design.

Therefore, it is an object of the present invention to provide for a vertical sync separator utilizing a device-independent methodology that minimizes the size and complexity of the associated separator circuitry.

It is a further object of the present invention to provide an improved high-performance vertical sync separator which can reliably operate during high frequency and non-standard input signal conditions.

From the subsequent detailed description taken in conjunction with the accompanying drawings and subjoined claims, other objects and advantages of the present invention will become apparent to those skilled in the art.

SUMMARY OF THE INVENTION

Accordingly, the present invention provides an improved high-performance vertical sync separator which can reliably operate during high frequency and non-standard input signal conditions and that utilizes a device-independent methodology. According to one embodiment, the present invention comprises a signal separator circuit having an input port for receiving a composite signal. A measuring device is connected to the input port for measuring a first and second characteristic of the composite signal. A processor receives and compares the first and second characteristics in order to cause an output signal to be recovered from the composite signal.

According to another embodiment, the present invention comprises a method for recovering signals from a composite signal. The method includes the steps of receiving a composite signal; measuring a first characteristic of the composite signal; measuring a second characteristic of the composite signal; comparing the first and second characteristics; and causing an output signal to be recovered from the composite signal as a result of the steps of measuring first and second characteristics of the composite signal.

BRIEF DESCRIPTION OF THE DRAWINGS

The present invention will become more fully understood from the detailed description and accompanying drawings, wherein.

DESCRIPTION OF THE PREFERRED EMBODIMENT

Figure 1:
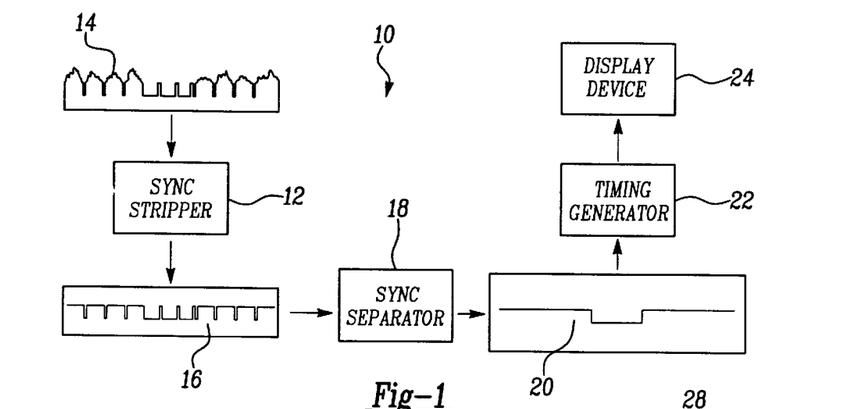
FIG. 1 is a block diagram of a video signal processing system incorporating the vertical synch separator of the present invention.

Referring to the drawings, FIG. 1 is a block diagram of a video system incorporating a vertical synch separator according to the present invention. The system 10 includes a sync stripper 12 that receives a video carrier signal 14 and strips a composite sync signal 16 from the video carrier signal. The sync stripper outputs the composite sync signal 16 to a vertical sync separator 18 of the present invention. The sync separator 18 separates a vertical sync signal 20 from the composite sync signal and outputs the vertical sync signal to a raster timing generator 22. The raster timing generator 22 subsequently determines sync priority to blank the video signal displayed on a video display device 24, as is well known in the art.

It should be appreciated that, depending upon the particular design of the video system, a sync stripper 12 may not be necessary if the composite sync signal is input separately from the video carrier signal. Also, the vertical sync separator of the present invention may be operative to separate the vertical sync signal from a composite horizontal sync signal or a composite horizontal sync signal embedded in a video signal.

Figures 2, 3:
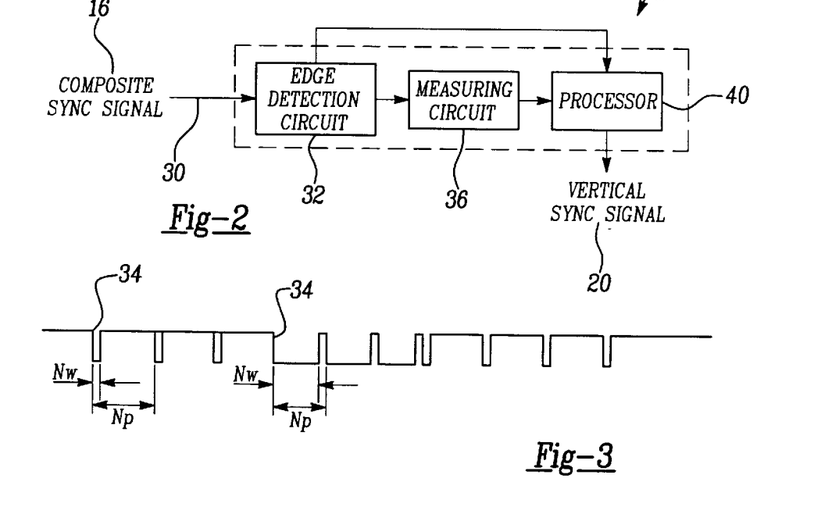
FIG. 2 is a block diagram illustrating the vertical synch separator of the present invention in greater detail.
FIG. 3 is a typical composite horizontal sync signal.

Referring to FIG. 2, a block diagram of the components of the sync separator 18 is shown at 28. The composite sync signal 16 is input into the sync separator at separator input port 30. The input port 30 feeds the signal into an edge detection circuit 32 that detects a falling edge of the composite sync signal, as shown at 34 in FIG. 3. The falling edge of the composite sync signal indicates the beginning of a horizontal pulse period, designated Np, and the beginning reference point for measurement of the horizontal sync signal pulse width, designated Nw. Both the signal period Np and the signal pulse width Nw are essential in separating the vertical sync signal from the composite sync signal, as will be explained in detail below.

The edge detection circuit 32 outputs a signal indicative of the sensed sync signal falling edge to a signal measuring circuit 36. As will be described below, the signal measuring circuit 36 measures the latched pulse width $Nw_{latch}$, the latched period $Np_{latch}$, and the present pulse width Nw in terms of clock pulses. The signal measuring circuit outputs both current and latched composite sync signal pulse width and period data to a signal processor 40. The processor 40, which is preferably a sync signal comparator that is programmed in Altera Hardware Description Language (AHDL), outputs the vertical synchronization signal based on data input from the edge-detection circuit and the signal measuring circuit. The output vertical sync signal is then utilized for effective blanking of the beam of energy scanned in the vertical direction during generation of a video image.

Figure 4:
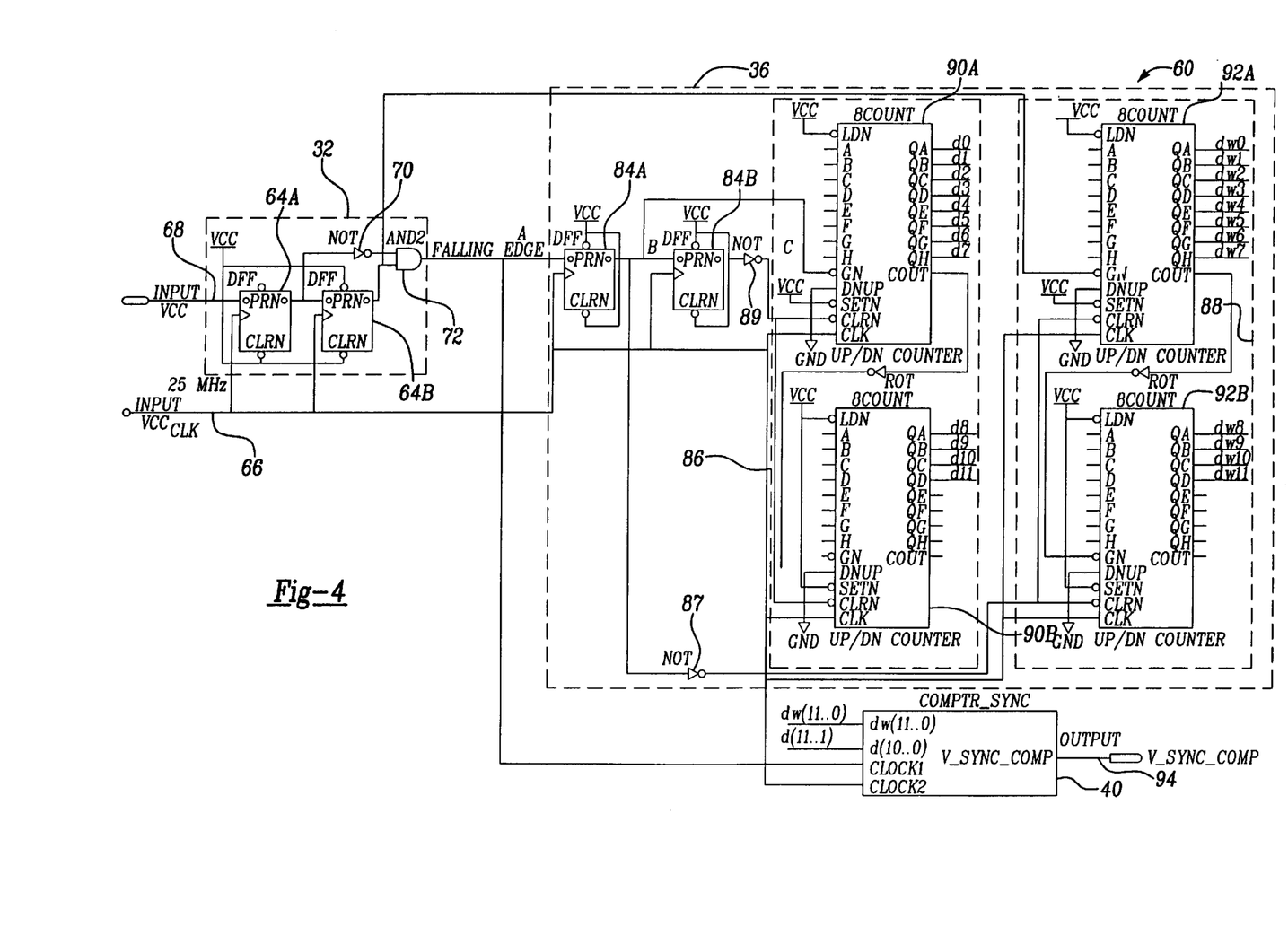
FIG. 4 is a schematic diagram showing the digital components of the vertical synch separator of the present invention.

Referring to FIG. 4, a detailed schematic diagram of the edge detection circuit 32, signal measuring circuit 36 and signal comparator 40 is shown at 60. The edge detection circuit 32 includes a pair of D-type flip-flops 64a, 64b that latch each falling edge of the composite sync signal pulse. Signals are clocked into both flip-flop inputs by a system clock signal 66, which preferably has a frequency of around 25 MHz. The composite sync signal is clocked into the flip-flop 64a at an input 68. In response to a sync signal pulse falling edge, the flip-flop 64a outputs a logical "0" output, with an associated 1 clock cycle delay, to the input of the flip-flop 64b, thereby causing the flip-flop 64b to generate a logical "0" output pulse signal.

Figure 4A:
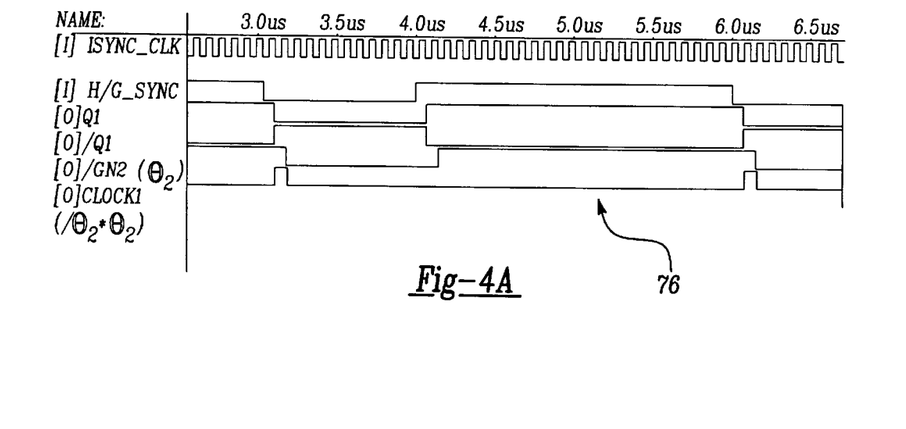
FIG. 4A shows the wave form of an edge detection circuit in the vertical sync separator of the present invention.

The output signal of the flip-flop 64a is also input to a NOT gate 70. The NOT gate 70 inverts the logical "0" output signal from the flip-flop 64a and inputs the inverted signal to a first input of an AND gate 72. The signal generated by the flip-flop 64b has an associated two clock cycle delay, and is output to a second input of the AND gate 72. As a result, the AND gate 72 outputs a logical "1" signal indicative of the composite sync signal falling edge based on the logical state of the inverted signal from flip-flop 64a and the non-inverted signal input from flip-flop 64b. More particularly, the AND gate output signal is based on the wave form shown at 76 in FIG. 4A.

As indicated above, a logical "1" output with one system clock width from the AND gate indicates the occurrence of a composite sync signal falling edge. The logical "1" signal output from the AND gate indicating a composite sync signal falling edge is clocked into the signal measuring circuit 34, and, more specifically, into a third flip-flop 84a where it is delayed one system clock. The delayed signal is used as an enable signal for the first counter 86. The output signal is also inverted by a NOT gate 87 to clean a second counter 88.

In addition, the output signal from the third flip-flop 84a is fed to the fourth flip-flop 84b in the signal measuring circuit 34. After another system clock delay by 84b the falling edge signal at the output of AND gate 72 is inverted by a NOT gate 89 to clean a first counter 86. The first counter 86, which includes two interconnected 8 count counters 90a, 90b, is used to measure the period, Np, of the composite sync pulse from a first detected falling edge to a second detected falling edge. The second counter 88 also includes two 8 count counters 92a, 92b and is used to measure the pulse width Nw of the sync signal from a signal failing edge to a signal rising edge. Both counters output signal measurement data to the comparator sync 40. Preferably each counter is an up-down carry-look-ahead 8 bit counter, that functions as described by the truth table shown below in Table 1.

TABLE 1

| CLK | CLRN | Inputs SETN | LDN | DNUP | GN | QH | Outputs OG ... OB | OA |
|---|---|---|---|---|---|---|---|---|
| X | L | H | X | X | X | L | L ... L | L |
| X | H | L | X | X | X | h | g ... b | a |
| ↑ | H | H | L | X | X | h | g ... b | b |
| ↑ | H | H | H | H | L |  | Count Down |  |
| ↑ | H | H | H | L | L |  | Count Up |  |
| ↑ | H | H | H | X | H |  | Hold Count |  |

| DNUP | LDN | Inputs GN | QH | QG ... OB | QA | Outputs COUT |
|---|---|---|---|---|---|---|
| L | H | L | H | H ... H | H | H |
| H | H | L | L | L ... L | L | H |
|  |  | Others |  |  |  | L |

The comparator sync processes the measurement data from both counters 86, 88 along with the AND gate output signal, to output the vertical sync signal at 94 based on logic programmed into the sync comparator, as will now be described.

Figure 5A:
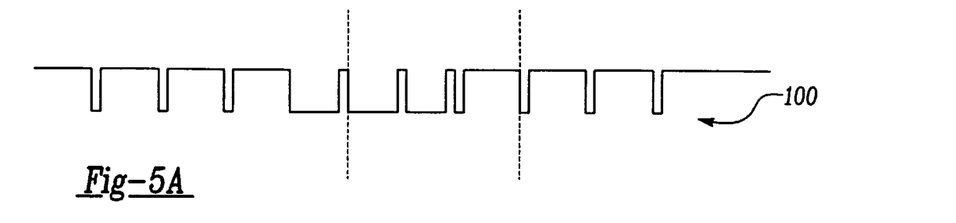
FIG. 5A shows a standard composite horizontal sync pulse.
Figure 5B:
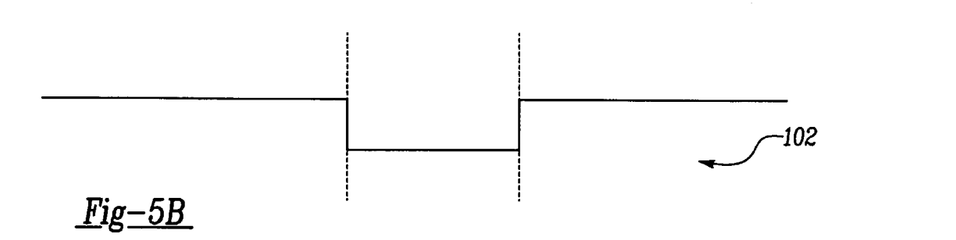
FIG. 5B shows a vertical sync signal separated from the composite horizontal sync pulse of FIG. 4A using a conventional sync separator.

As shown in FIG. 5A, for a composite horizontal sync signal 100, it is a technical requirement that the composite, or horizontal, sync signal width normally is less than 10% of the signal period. However, during the period of a vertical sync signal, the width is usually larger than 90% of the horizontal period. Therefore, the vertical sync signal can be detected based on this characteristic, assuming the input composite sync signal is negative going. By using two 12-bit counters operating under system clock (25 MHz), the sync pulse width, Nw, and period, Np, can be measured. $Nw_{latch}$ and $Np_{latch}$ are the latched pulse width and period at the presently occurring falling edge of horizontal sync. The vertical sync signal is then separated as shown at 102 in FIG. 4B through implementation of the following:

IF $Nw_{latch} < \frac{1}{2} Np_{latch}$

V_Sync = Vcc;

ELSE

V_Sync = GND;

where Vcc and GND refer to +5 V and the ground of the system, respectively.

Figure 6A:
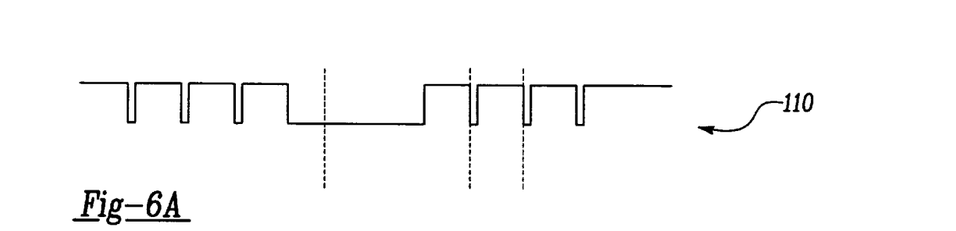
FIG. 6A shows a non-standard composite horizontal sync pulse.
Figure 6B:
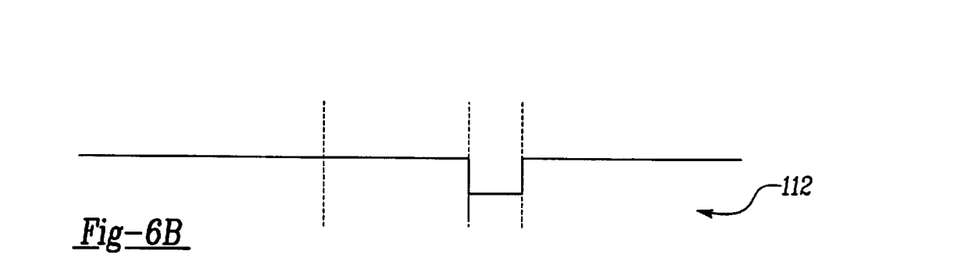
FIG. 6B shows a vertical sync signal separated from the composite horizontal sync pulse of FIG. 5A using the sync separator of the present invention.

However, there are some non-standard composite sync signals that have the wave form shown at 110 in FIG. 6A. In such cases, the delay of vertical sync separated by using the previous method is greater than the delay that can be handled by the above logic. The above implemented logic would result in the vertical sunc signal shown at 112 in FIG. 6B. The signal 112 would cause the raster timing generator to incorrectly blank the video display device.

To handle this kind of situation, the above logic must be modified as follows:

IF $(Nw_{latch} < \frac{1}{2} Np_{latch})$ or $(Nw < \frac{1}{2} Np_{latch})$

V_Sync = Vcc;

ELSE

Figure 6C:
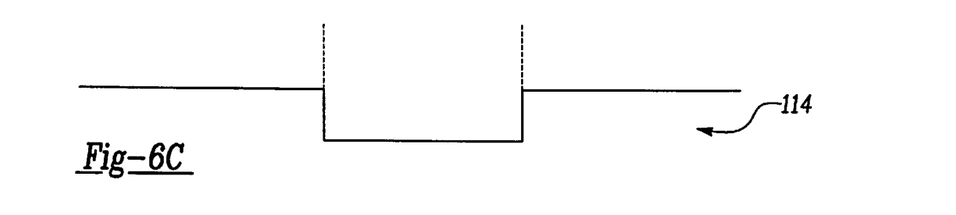
FIG. 6C shows a vertical sync signal separated from the composite horizontal sync pulse of FIG. 5A using the modified sync separator of the present invention.

V_Sync = GND;

The resulting separated vertical sync signal is shown at 114 in FIG. 6C. The associated signal delay is much smaller than with previous vertical sync signal separators. More specifically, the delay is always less than one horizontal line and is guaranteed.

Figure 7:
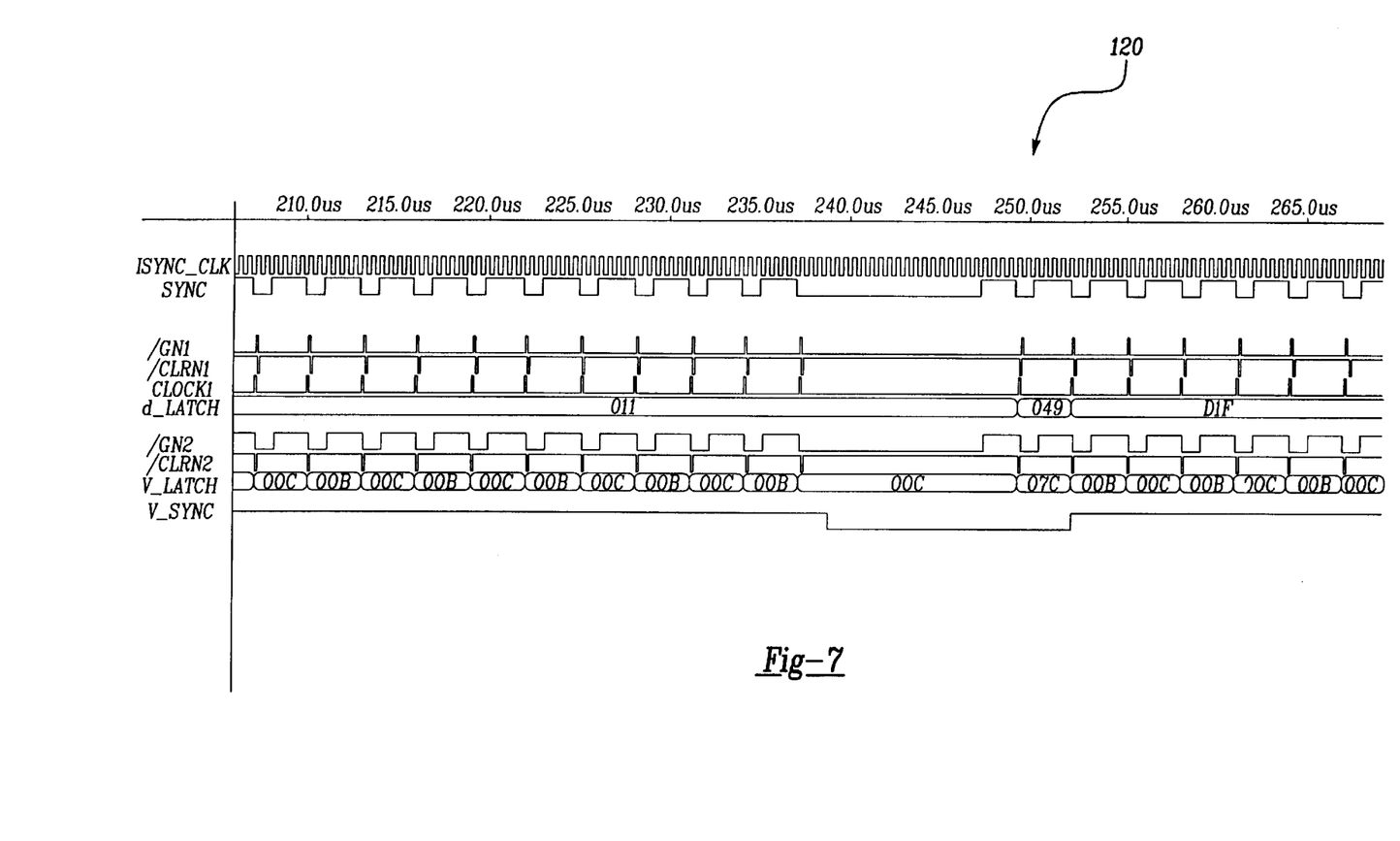
FIG. 7 illustrates the signal outputs of the digital components of the vertical sync separator shown in FIGS. 3 and 4.

Operation of the vertical sync separator will now be described in relation to the signals output from the sync separator components, as shown graphically at 120 in FIG. 7. Specifically, the composite sync signal SYNC is clocked into the edge detection circuit 32 by system clock signal (sync_clk). Upon detecting a falling edge, the processor latches both the composite sync signal period Np and width Nw. After Np is latched, a clear signal /CLRN1 of the first counter is asserted, and the counter is cleaned. After that, the first counter starts to count the system clock numbers until a counter enable signal /GN1 goes high at the end of one horizontal period. The /CLRN1 signal is generated by delaying and inverting the /GN1 signal.

The output of the second flip-flop 64b is fed to the second counter as an enable signal. Therefore, the second counter can count the system clock numbers of the sync pulse width, Nw. Nw is latched in the same way as the first counter 90, i.e. Nw is latched at the falling edge of the next horizontal sync. After Nw is latched, the second counter is cleaned by asserting a /CLRN2 signal, which is generated by inverting the counter enable signal /GN1 of the first counter 90. After the second counter is cleaned, the second counter counts the system clock numbers of the sync pulse width and the procedure is repeated.

The counter output signals are latched at the falling edge of the composite sync signal. These two latched signals, d_latch (which is $Np_{latch}$) and w_latch (which is $Nw_{latch}$) are compared by the comparator sync 40. The comparator sync subsequently outputs the separated vertical sync signal V_SYNC to the raster timing generator.

The vertical sync separator of the present invention has been implemented using a part of an ALTERA FPGA, Model No. 10K20RC208-4. The vertical sync separator of the present invention has been tested on a Hughes JVC Model M200 video projector using a Model 100 System/RTG board. The video signal generator used in the testing was a QUANTUM DATA Model 801 GF generator, which can generate over one hundred video sources. The vertical sync separator of the present invention successfully separated the vertical sync signal from both a composite horizontal sync signal and a composite sync signal on a green video channel (SOG), with an associated delay of less than one horizontal line.

Since no loop exists between the vertical sync signal separation and sync priority circuitry when this sync separator is used in conjunction with a Model 100 RTG board, the sync selection circuit is simplified dramatically compared to the presently used sync selection circuits in Hughes JVC Model M200/M220 projectors. The new digital sync priority circuitry, including the digital vertical sync separator of the present invention, exhibits improved performance, because all input sync signals are treated equally.

Upon reading of the foregoing description, it should be appreciated that the vertical sync separator of the present invention exhibits improved performance when compared to existing vertical sync separators that are implemented in analog methods. The vertical sync separator of the present invention successfully separates the vertical sync signal from any standard or non-standard composite sync signal through implementation of the above-described logic which compares three sets of data, Nw, $Nw_{latch}$, and $Np_{latch}$. Only when either Nw or $Nw_{latch}$ are detected as being less than half of $Np_{latch}$ is a vertical sync signal detected.

Also, it should be appreciated that the vertical sync separator of the present invention operates at a high frequency, including frequencies beyond 150 Hz, and therefore is applicable to a wide variety of video systems, including high definition television, computer and VCR applications. The vertical sync separator can also be combined with digital serration removal and even/odd field detection to yield a digital sync process. The sync separator of the present invention is completely digital, therefore allowing the separator to be implemented in a cost-effective manner. The sync separator of the present invention also is cost-effective in that it does not require the horizontal sync signal to be converted to voltage before the vertical sync signal is extracted.

It is understood that many modifications and variations of the present invention are possible in light of the above teachings. Therefore, any other embodiments which fall within the scope and spirit of the present invention are intended to be covered by the following claims.

What is claimed is:

1. A signal recovery circuit comprising:

an input port for receiving a composite signal, the composite signal having a series of digital pulses;

a signal detection device connected to the input port for detecting a periodic parameter of the composite signal;

a signal measuring device connected to the signal detection device for measuring a first characteristic and a second characteristic of the composite signal after the signal detection device detects the periodic parameter, the first characteristic being a pulse width of a first pulse contained within the series of digital pulses and the second characteristic being a period of the composite signal measured from the temporal distance between the first pulse and a second pulse contained within the series of digital pulses; and a processor connected to the signal detection device and the signal measuring device for comparing the first characteristic to the second characteristic to recover an output signal from the composite signal.

2. The circuit according to claim 1, wherein the composite signal and the output signal comprise a series of digital pulses each having a leading edge, a trailing edge, and a pulse width, wherein the measuring device measures the second characteristic by determining the period of the composite signal from the temporal distance between the leading edge of the first pulse and the leading edge of the second pulse contained within the series of digital pulses.

3. The circuit according to claim 1 wherein the processor generates the output signal by generating an output pulse when the pulse width of the first pulse is less than half the period of the composite signal.

4. The circuit according to claim 1 wherein the measuring device measures a third characteristic of the composite signal by determining an instantaneous value of the pulse width of the second pulse, the instantaneous value being determined by the time elapsed from the detection of the leading edge of the second pulse and prior to the detection of the trailing edge of the second pulse.

5. The circuit according to claim 4, wherein the processor generating the output signal when either the pulse width of the first pulse or the instantaneous value of the pulse width of the second pulse are less than half the period of the composite signal.

6. The circuit according to claim 2, wherein the signal detection circuit receives the composite signal from the input port, detects the leading edge of a pulse contained within the series of digital pulses, and generates control signals for controlling the measuring device and the processor.

7. The circuit according to claim 1 wherein the signal measuring device and the processor operate collectively to repeatedly update and compare the first characteristic to the second characteristic to recover the output signal even when the composite signal changes or deviates from a standard format.

8. The circuit according to claim 1, wherein the composite signal is a synchronization signal used to coordinate a blanking operation of a beam of energy which is scanned both in a horizontal and a vertical direction to generate a video image, and wherein the recovered output signal is a vertical synchronization signal.

9. A method for recovering signals from a composite signal comprising the steps of:

detecting a periodic parameter of a composite signal, the composite signal having a series of digital pulses;

measuring a first characteristic of the composite signal, the first characteristic being a pulse width of a first pulse contained within the series of digital pulses;

measuring a second characteristic of the composite signal, the second characteristic being a period of the composite signal measured from the temporal distance between the first pulse and a second pulse contained within the series of digital pulses;

comparing the first characteristic to the second characteristic; and recovering an output signal from the composite signal based on the step of comparing the first characteristic to the second characteristic.

10. The method according to claim 9, wherein the composite signal and the output signal are digital signals comprising a series of digital pulses, each of the digital pulses having a leading edge, a trailing edge, and a pulse width.

11. The method according to claim 9, wherein the composite signal is a synchronization signal that coordinates a blanking operation of a beam of energy scanned in a horizontal and a vertical direction to generate a video image, and wherein the step of comparing the first and second characteristics is performed to recover a vertical synchronization signal from the composite signal to synchronize the blanking of the beam of energy with the vertical scanning motion of the beam.

12. The method according to claim 9, wherein the step of measuring the second characteristic comprises determining the period of the composite signal by measuring the temporal distance between the leading edge of the first pulse and the leading edge of a subsequent second pulse contained within the series of digital pulses.

13. The method according to claim 12, further comprising the step of generating an output pulse when the pulse width of the first pulse is less than half the period of the composite signal.

14. The method according to claim 12 further comprising the steps of:

measuring a third characteristic of the composite signal by determining an instantaneous value of the pulse width of the second pulse;

measuring the time elapsed from the detection of the leading edge of the second pulse and prior to the detection of the trailing edge of the second pulse; and generating an output pulse when either the pulse width of the first pulse or the instantaneous value of the pulse width of the second pulse are less than half the value of the period of the composite signal.

15. The method according to claim 9 wherein the steps of measuring and comparing the first and second characteristics are repeatedly performed such that the output signal can be recovered even when the composite signal changes or deviates from a standard format.

16. A video display system comprising:

a system input for receiving a video signal;

a sync stripper connected to the input port for separating a composite synchronization signal having a series of digital pulses from the video signal, wherein each of the digital pulses has a leading edge, a trailing edge and a pulse width;

a digital sync separator for receiving the composite synchronization signal and separating a vertical synchronization signal therefrom by measuring and comparing a first parameter of the composite synchronization signal to a second parameter of the composite synchronization signal, the first parameter being a pulse width of a first pulse contained within the series of digital pulses and the second parameter being a period of the composite signal measured from the temporal distance between the first pulse and the second pulse contained within the series of digital pulses; and an image generator for responding to the video signal and the vertical synchronization signal in order to generate a video image by scanning and selectively blanking a beam of radiant energy which is incident upon a display device.

17. The video display system of claim 16, wherein the digital sync separator comprises:
   an edged protection circuit for receiving a falling edge of the composite synchronization signal beam and for outputting a detection signal in response to detecting the following edge;
   a signal measuring circuit connected to the edge detection circuit for measuring the pulse width of the first signal and a signal in terms of clock pulses supplied from a system clock; and
   a processor for receiving the pulse width of the first pulse and the signal period and generating a pulse contained with the vertical synchronization signal when the pulse width of the first pulse is less than a predetermined fraction of the instantaneous period.

18. The video display system of claim 16, wherein the signal measuring circuit measures a third characteristic of the composite signal by determining an instantaneous value of a pulse width a second pulse, the instantaneous value being determined by measuring a time elapse since the detection of the leading edge of the second pulse in part to the detection of the trailing edge of the second pulse.

19. The video display system of claim 18, wherein the processor generates the output signal when either the pulse width of the first pulse or the instantaneous value of the pulse width of the second pulse are less than half the value of the instantaneous period of the composite signal.

20. The video display system of claim 16, wherein the digital sync separator repeatedly measures and compares the first and second parameters such that the vertical synchronization signal can be separated even when the composite synchronization signal changes or deviates from a standard format.

21. A signal recovery circuit comprising:
   an input port for receiving a composite signal, the composite signal having a series of digital pulses each having a leading edge, a trailing edge, and a pulse width;
   a signal detection device connected to the input port for detecting a periodic parameter of the composite signal;
   a signal measuring device connected to the signal detection device for measuring a pulse width of a first pulse contained within the series of digital pulses, a period of the composite signal determined from the temporal distance between the leading edge of the first pulse and the leading edge of a second pulse contained within the series of digital pulses, and an instantaneous value of the pulse width of the second pulse determined by the time elapsed from the detection of the leading edge of the second pulse and prior to the detection of the trailing edge of the second pulse; and
   a processor connected to the signal detection device and the signal measuring device for recovering an output signal from the composite signal, the processor generating the output signal when either the pulse width of the first pulse or the instantaneous value of the pulse width of the second pulse are less than half the period of the composite signal.

* * * * *

UNITED STATES PATENT AND TRADEMARK OFFICE
CERTIFICATE OF CORRECTION

PATENT NO. : 5,999,222
DATED : December 7, 1999
INVENTOR(S) : Guoxin Xie

It is certified that error appears in the above-identified patent and that said Letters Patent is hereby corrected as shown below:

Title page, [57] Abstract line 5, page 19, line 4, "synch" should be --sync--.

Column 1, line 22, page 1, line 14, after "image" insert --to--.

Column 1, line 47, page 2, line 12, "synch" should be --sync--.

Column 2, line 25, page 3, line 21, "synch" should be --sync--.

Column 2, line 27, page 3, line 22, "synch" should be --sync--.

Column 2, line 31, page 4, line 2, "synch" should be --sync--.

Column 2, line 56, page 4, line 18, "synch" should be --sync--.

Column 3, line 23, page 5, line 16, "failing" should be --falling--.

Column 4, line 19, page 6, line 21, "circuit 34" should be --circuit 36--.

Column 4, line 27, page 6, line 26, "circuit 34" should be --circuit 36--.

Column 4, line 35, page 7, line 6, "failing" should be --falling--.

Column 4, line 43, page 7, line 12, "OG...QB" should be --QG...QB--.

Column 4, line 43, page 7, line 12, "OA" should be --QA--.

Column 4, line 46, page 7, line 15, "b" should be --a--.

Column 4, line 51, page 7, line 19, "LDN" should be --LDN*--.

UNITED STATES PATENT AND TRADEMARK OFFICE
CERTIFICATE OF CORRECTION

PATENT NO. : 5,999,222
DATED : December 7, 1999
INVENTOR(S) : Guoxin Xie

It is certified that error appears in the above-identified patent and that said Letters Patent is hereby corrected as shown below:

Column 4, line 51, page 7, line 19, "QG...OB" should be --QG...QB--.

Column 5, line 10, page 8, line 13, "4B" should be --5B--.

Column 5, line 26, page 8, line 23, "sunc" should be --sync--.

Column 9, line 19, claim 18, page 5, line 3, after "width" insert a coma.

Signed and Sealed this

Fourteenth Day of November, 2000

*Attest:*

Q. TODD DICKINSON

*Attesting Officer*      *Director of Patents and Trademarks*